Oct. 15, 1935.                J. W. PARKER                2,017,290
                           SPINDLE CONSTRUCTION
                          Filed March 3, 1934
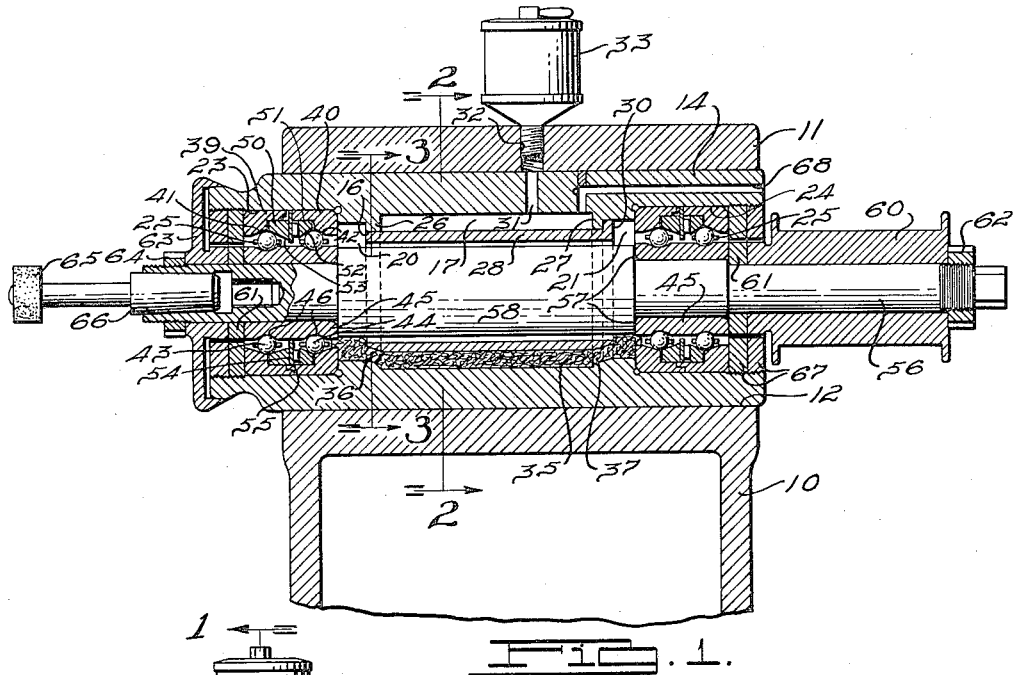
INVENTOR.
John W. Parker.
BY
Harness, Dickey, Pierce & Hann
ATTORNEYS.

Patented Oct. 15, 1935

2,017,290

UNITED STATES PATENT OFFICE 2,017,290

SPINDLE CONSTRUCTION

John W. Parker, Detroit, Mich.

Application March 3, 1934, Serial No. 713,806

3 Claims. (Cl. 308—187)

This invention relates to the construction of spindles for high speed boring units and the like, and more especially to means for insuring quietness of operation of the bearings and spindle shafts of such units.

The principal object of the invention is to provide an improved spindle construction.

Another object is to provide bearings for a spindle shaft which will automatically take up wear and allow axial thrust of the spindle shaft due to unequal expansion of such shaft and the spindle body without causing chattering, vibration, or uneven operation of the spindle shaft or bearing.

A further object is to provide for the regulation of the flow of lubricant to the bearing of a high speed spindle shaft.

It is also an object of this invention to prevent grit and dirt from being carried to the spindle bearings by the lubricant supplied thereto.

A still further object is to provide means for feeding lubricant to the bearings of a high speed spindle by capillary action through the intermediary of a wick-like means while preventing the latter from interfering with the operation and assembly of the spindle.

Another object of the invention is to provide means for feeding limited quantities of lubricant to bearings of a high speed spindle while at the same time filtering out dirt or solid matter from the lubricant to prevent its transmission to parts of the spindle bearings.

It is a further object of the invention to provide a spindle construction containing a lubricant reservoir and means for feeding clean lubricant to the spindle shaft bearings, said spindle and the lubricating system therefor being removable as a unit from the mounting for the spindle.

Other objects, features and advantages will become apparent from the following description and appended claims.

For the purpose of illustrating the genus of the invention, a typical concrete embodiment is shown in the accompanying drawing, in which:

Figure 1 is a central and in part vertical section taken on the line 1—1 of Fig. 2;

Fig. 2 is a section taken on the line 2—2 of Fig. 1; and

Fig. 3 is a section, on an enlarged scale, taken on the line 3—3 of Fig. 1.

In the use of high speed precision spindles, the accuracy of the work performed depends largely on the steadiness of operation of the spindle shaft which in turn depends primarily upon balance of the shaft and upon the character, condition and lubrication of the bearings for such spindle shaft. The bearings for the spindle shaft should automatically take up end play of the spindle shaft and allow relative linear expansion of the shaft and spindle body without causing excessive loading or binding of the bearings. The bearings should also automatically compensate for wear of the anti-friction elements and races so that play within the bearings will be reduced to a minimum. I have also found that the quantity of lubricant supplied to the bearings should be regulated since too small a quantity of lubricant causes destruction of the anti-friction elements and races and too great a quantity of lubricant has a similar effect. With an excessive quantity of lubricant supplied to the bearings the high speed operation of the spindle throws the lubricant outwardly due to centrifugal forces set up therein and increases the pressures of the lubricant at the inner surfaces of the outer races and other parts engageable with the anti-friction elements. This high pressure developed between the inner surfaces of the elements engageable with the outermost parts of the anti-friction elements causes a pitting of such anti-friction elements which in turn causes scoring of the bearing races and other parts engageable with the anti-friction elements.

Referring to the drawing in detail, the numeral 10 indicates a frame including a split clamp 11 and cylindrical bore 12 adapted to hold a spindle body 14 therein. The spindle body 14 is provided with a longitudinal bore 16 deepened at the central portion of the spindle body to provide a lubricant recess or annular reservoir 17. Axially outwardly of the annular reservoir 17 and spaced therefrom, the bore 16 is deepened to provide the cylindrical spaces 20 and 21 and axially beyond these cylindrical spaces the bore 16 is enlarged or deepened still more to provide the cylindrical longitudinal bored portions 23 and 24 for the reception of bearings 25. The axial spacing between the cylindrical bored portions 20 and 21 and the annular reservoir 17 provides inwardly directed annular shoulders 26 and 27 in which a sleeve 28 is disposed. The sleeve 28 is provided with an outwardly directed flange 30 engageable with the inwardly directed annular flange 27 of the spindle body 14 and fitting the bore 21. The spindle body 14 is provided with a downwardly directed passage extending to the oil reservoir 17 and communicates with a passage 32 provided to the top of the split clamp 11 and threaded to receive an oil cup 33. Wick members 35 are arranged longitudinally of the bottom of the lubricant reservoir 17 and extend through recesses provided to the inwardly directed annular flanges 26 and 27 and the outwardly directed flange 30 to provide passages 36 and 37 through these flanges. The passages 36 and 37 are inclined in an upward direction from the bottom of the reservoir 17 and extend into the cylindrical bores 20 and 21 provided adjacent the bearings 25. The wick members 35 extend through the passages 36 and 37 and into the bottom portion of the cylindrical bores 20 and 21 so as to contact one side of each of the bearings 25.

The bearings 25 are of the type disclosed in the United States Patent 1,886,219 granted to the present applicant November 1, 1932, and each comprises a pair of outer race ring sections 39 and 40 which have inwardly sloping faces 41 and 42 respectively. The sloping faces 41 and 42 engage the outer side of two rows of ball bearings 43 and 44 which are interposed between the inner and outer races of the bearings. The inner race 45 of each bearing is provided with a pair of axially spaced radius grooves 46 of considerably less curvature than that of the ball bearings 43 and 44. The outer race sections 39 and 40 are annularly recessed inwardly of the sloping faces 41 and 42 for the reception of inner race rings 50 and 51 which are axially slidable within the annular recesses therefor and have outwardly sloping faces 52 and 53 adapted to engage the inner side of the two rows of ball bearings 43 and 44, thus forming angled grooves or races for the balls. Annular rings of spring steel 54 having a plurality of spring lugs 55 struck out from the peripheral margin thereof are provided for axially separating the inner race rings 50 and 51 to automatically take up wear of the ball bearings and race elements engaged therewith and yieldably to oppose relative axial displacement of the inner and outer races of the bearings. Axial displacement in either direction of the inner race 45 with respect to the outer race ring sections 39 and 40 will wedge the inner race rings 50 and 51 toward one another against the biasing action of the resilient element 54. Axial displacement of the inner ring relative to the outer ring sections in either direction will move the ball bearings 43 and 44 inwardly toward the spring element 54 and radially outwardly with respect to the axis of the bearing. Thus the spring element 54 not only separates the inner race ring elements 50 and 51 to compensate for wear of the ball bearings and race elements in contact therewith, but also resiliently opposes axial displacement of the inner race with respect to the outer race ring sections. The inner races 45 are pressed on a spindle shaft 56 adapted to be journaled therein and abut against shoulder portions 57 of an enlarged spindle section 58. The outer race ring sections 39 and 40 are clamped within the cylindrical bores 23 and 24 by lock discs 67 threaded to the outer ends of the walls of the bores 23 and 24. A pulley 60 and spacer member 61 are retained on the rear end of the shaft 56 by means of a nut 62. Upon the front end of the shaft 56 a cap member 63 and a spacer member 61 are retained upon the shaft by means of a nut 64 which also serves to retain the spindle of a tool 65 within a bore 66 provided on the forward end of the shaft 56. A vent passage 68 extends horizontally and then downwardly from rear end face of the spindle body 14 to the top of the annular reservoir 17.

In the operation of the spindle, the wicks 35 feed, by capillary action, lubricant from the reservoir 17 to the bearings 25 in limited quantities so that excessive pressures of oil or other lubricant are not developed between the ball bearing elements and the outer race ring sections 39 and 40 and the inner race rings 50 and 51. This prevents pitting of the ball bearing elements 43 and 44 and destruction of the race rings 39, 40, 50 and 51. The horizontal disposition of the major portion of the vent passages reduces the likelihood of grit or dirt entering the reservoir 17. Even if solid matter is admitted to the lubricant reservoir, the wick member 35 will filter the lubricant so that no foreign matter can be carried to parts of the bearings so as to cause injury thereto. The bearings 25 will permit unequal linear expansion of the spindle shaft 56 and the spindle body 14 and at the same time preserving three point contact between the ball bearing elements and the inner and outer races of the bearings. This reduces play within the bearings to a minimum and eliminates vibration and chatter of the spindle shaft when rotated at high speed.

It is to be particularly noted that not only is the spindle body 14 and all other parts of the spindle structure mounted therein applicable to and removable from a machine tool as a unit, as in conventional constructions, but additionally it has the novel feature of incorporating its own oiling system and oil reservoir as a built in part of the unit, and thus removal, or changing of the unit between different machine tools, will not expose the lubricating system to the introduction of foreign matter.

As many changes could be made in the above construction and many apparently widely different embodiments of this invention could be effected without departing from the scope thereof, it is intended that all matter contained in the above description or shown in the accompanying drawing shall be interpreted as illustrative and not in a limiting sense.

What is claimed is:

1. In a boring tool, a spindle comprising a longitudinally hollow spindle body, aligned bearings arranged in spaced relation in said body, a spindle shaft journaled in said bearings, said hollow body providing a lubricant reservoir intermediate said bearings, wick means for conveying lubricant from said reservoir to each of said bearings, and a sleeve axially arrranged in said body and surrounding said spindle shaft for maintaining the major portion of said wick means in spaced relation with respect to rotatable parts of said tool.

2. In a boring tool, a spindle comprising a longitudinally hollow spindle body, aligned bearings arranged in spaced relation in said body, a spindle shaft journaled in said bearings, said hollow body providing a lubricant reservoir intermediate said bearings, spaced annular flanges directed inwardly of the bore of said spindle body and intermediate said bearings a sleeve disposed in said annular flanges and provided with a flanged end engageable with one of said annular flanges for limiting movement of said sleeve in one direction with respect to said body, and wick means arranged between said sleeves and the spindle body and extending from the lubricant reservoir to each bearing for conveying lubricant to said bearing and for filtering out solid matter from the lubricant to prevent injury to said bearings.

3. In a boring tool, a spindle comprising a longitudinally hollow spindle body, aligned bearing arranged in spaced relation in said body, a spindle shaft journaled in said bearing, said hollow body providing a lubricant reservoir intermediate said bearing, means for conveying lubricant from said reservoir by capillary action to each bearing, and a vent passage extending for the major portion of its length longitudinally of said spindle body from an end wall thereof and then inwardly of the spindle body to the reservoir therein.

JOHN W. PARKER.